(12) United States Patent
Yang et al.

(10) Patent No.: US 10,328,978 B2
(45) Date of Patent: Jun. 25, 2019

(54) VEHICLE SILL REINFORCEMENT

(71) Applicant: Ford Global Technologies, LLC, Dearborn, MI (US)

(72) Inventors: Herbert Yang, Saline, MI (US); Praveenmanickam Renganathan, Detroit, MI (US); Shekar Prabhakar Erasala, Northville, MI (US); John Michael McGuckin, Ann Arbor, MI (US); Michael Luchtman, Clawson, MI (US); Shawn Michael Morgans, Chelsea, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 86 days.

(21) Appl. No.: 15/630,458

(22) Filed: Jun. 22, 2017

(65) Prior Publication Data
US 2018/0370573 A1  Dec. 27, 2018

(51) Int. Cl.
*B62D 25/02* (2006.01)
*B62D 21/15* (2006.01)
*B62D 25/20* (2006.01)

(52) U.S. Cl.
CPC ......... *B62D 25/025* (2013.01); *B62D 21/157* (2013.01); *B62D 25/2036* (2013.01); *B62D 25/02* (2013.01)

(58) Field of Classification Search
CPC ...... B62D 21/15; B62D 21/157; B62D 23/00; B62D 25/02; B62D 25/025; B62D 25/2036

USPC .................................................. 296/30, 209
See application file for complete search history.

(56) References Cited

U.S. PATENT DOCUMENTS

| 5,613,727 A | 3/1997 | Yamazaki | |
|---|---|---|---|
| 8,366,185 B2* | 2/2013 | Herntier | B62D 25/025 296/187.12 |
| 8,651,565 B2* | 2/2014 | Zornack | B62D 21/00 296/203.03 |
| 8,702,161 B2* | 4/2014 | Charbonneau | B62D 21/157 296/187.12 |
| 9,493,190 B1 | 11/2016 | Alwan et al. | |
| 2012/0086238 A1 | 4/2012 | Tan | |
| 2016/0325786 A1 | 11/2016 | Elfwing | |

FOREIGN PATENT DOCUMENTS

| DE | 10248846 A1 | 4/2004 |
|---|---|---|
| DE | 102013004852 A1 | 9/2014 |
| DE | 202016107254 U1 | 3/2017 |
| JP | 201480117 A | 5/2014 |

\* cited by examiner

*Primary Examiner* — Jason S Daniels
(74) *Attorney, Agent, or Firm* — Vichit Chea; Bejin Bieneman PLC

(57) ABSTRACT

A rocker including a sill elongated along an axis and a reinforcement disposed in the sill. The reinforcement, in cross-section transverse to the axis, includes an intermediate portion, a first lobe, and a second lobe. The first lobe has a first wall extending from the intermediate portion to a first end. The second lobe has a second wall extending from the intermediate portion to the second end. The first and second ends abut opposite surfaces of the intermediate portion. The first lobe and the second lobe of the reinforcement resist buckling in response to components of the impact force applied to the sill reinforcement.

20 Claims, 4 Drawing Sheets

VEHICLE SILL REINFORCEMENT

BACKGROUND

A vehicle includes a body and, upon a side impact of a vehicle, an impact force created from the side impact may be delivered to the body, and the body may absorb some of the impact force during the side impact. The body is designed to provide structural rigidity to prevent unwanted deformation and/or to prevent intrusion during an impact.

For example, a battery electric vehicle includes a battery and the body may be designed to reinforce a battery compartment in which the battery is supported. For example, the body may include a pair of sills spaced from each other and extending in a vehicle-fore-and-aft direction to define the battery compartment between the sills. The battery may be disposed beneath a passenger compartment and between the pair of sills, e.g., in a battery compartment between the sills. The weight and location of the battery changes the weight distribution of the vehicle, and the corresponding impact deformation, in comparison to an internal combustion vehicle. In addition, the battery is susceptible to damage caused by body intrusion during an impact, e.g., during a side impact.

DETAILED DESCRIPTION

A rocker includes a sill elongated along an axis, and a reinforcement disposed in the sill. The reinforcement, in cross-section transverse to the axis, includes an intermediate portion, a first lobe having a first wall extending from the intermediate portion to a first end, and a second lobe having a second wall extending from the intermediate portion to a second end. The first and second ends abut opposite surfaces of the intermediate portion.

The first wall of the first lobe may define a first cavity and the second wall of the second lobe may define a second cavity. The first cavity may be larger than the second cavity. The first cavity and the second cavity may be trapezium shaped.

The intermediate portion and the first end may define a first valley therebetween, and the intermediate portion and the second end may define a second valley therebetween. The first valley and the second valley both may be external to the first cavity and the second cavity. The first lobe is welded to the intermediate portion in the first valley, and the second lobe is welded to the intermediate portion in the second valley.

The first wall and the second wall may extend toward each other along the intermediate portion at the first and second ends.

The sill may include a sill inner and a sill outer attached to the sill inner. The sill inner and the sill outer may define a cavity therebetween. The reinforcement may be disposed in the cavity. The first lobe may be supported by the sill inner and the second lobe may be supported by the first lobe.

The first lobe may include an inner side attached to the sill inner and an outer side spaced from the inner side. The outer side may include a hole designed to receive a weld head.

The rocker may include a bracket extending transverse to the axis from the first love to the second lobe. The bracket may be connected to both the first lobe and the second lobe.

The reinforcement may be unitary from the first end to the second end. The reinforcement may include a thickness between 1-3 mm. The thickness may be uniform from the first end to the second end. The reinforcement may be formed of martensitic steel.

The rocker may include a battery disposed adjacent the sill.

Figure 1:
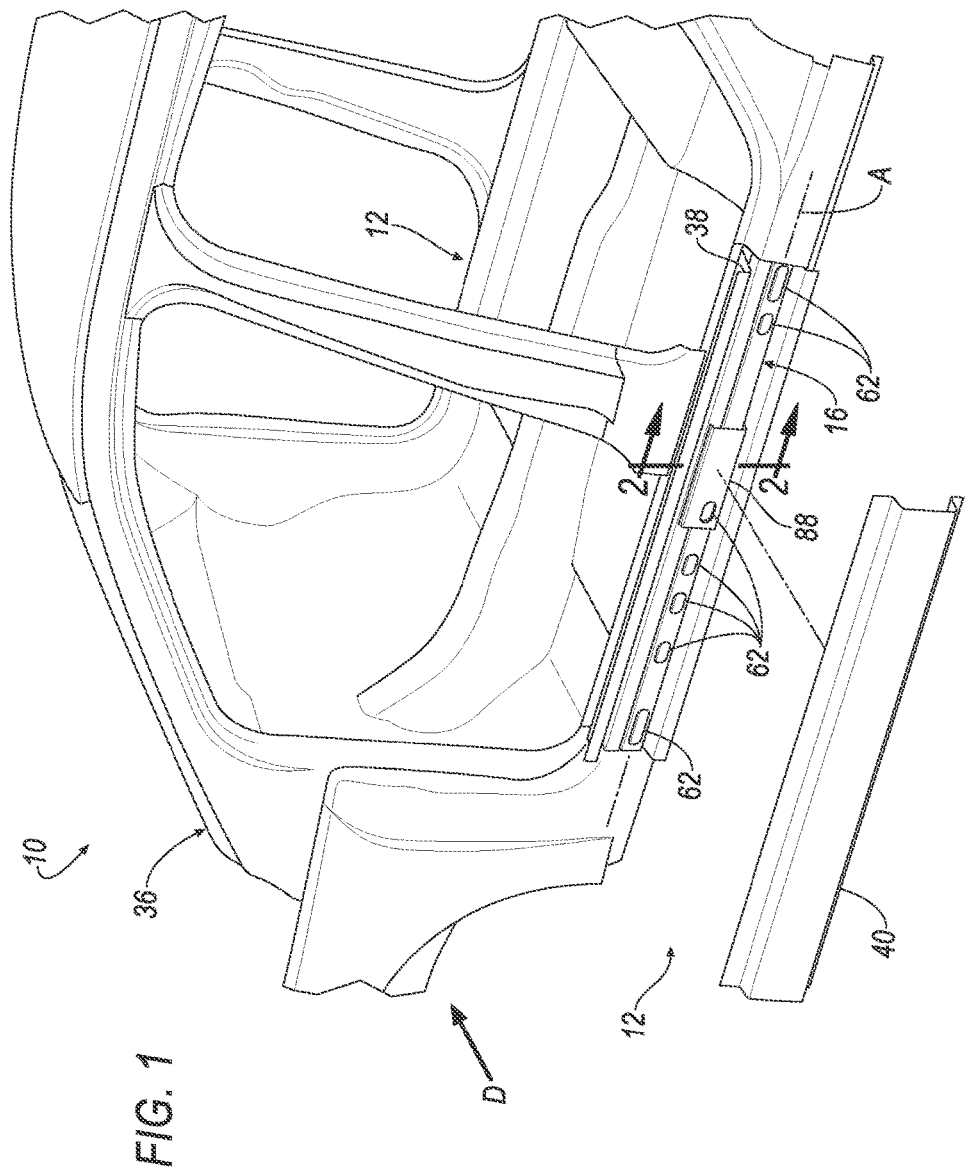
FIG. 1 is a partially-exploded perspective view of a portion of a body assembly of a vehicle including a sill inner, a sill outer, and a reinforcement disposed between the sill inner and the sill outer.

With reference to the Figures, wherein like numerals indicate like parts throughout the several views, a vehicle 10 is generally shown. The vehicle 10 includes a sill assembly 12 having a sill 14 elongated along an axis A and a reinforcement 16 disposed in the sill 14, as shown in FIG. 1. During a vehicle impact, the sill 14 may be impacted and be biased toward an occupant compartment of the vehicle 10. For example, during a side impact, the sill 14 may receive an impact force F, such as the force from a pole impact, vehicle-to-vehicle impact, etc. When the sill 14 is impacted, the sill 14 may transfer the impact force F to the reinforcement 16. In this situation, the reinforcement 16 may reinforce the sill 14 and absorb energy from the impact force F.

Specifically, the reinforcement 16, in cross section transverse to the axis A, includes an intermediate portion 18, a first lobe 20, and a second lobe 22. The first lobe 20 has a first wall 24 extending from the intermediate portion 18 to a first end 26. The second lobe 22 has a second wall 28 extending from the intermediate portion 18 to a second end 30. The first end 26 and the second end 30 abut opposite surfaces 32, 34 of the intermediate portion 18. By reinforcing the sill 14, the reinforcement 16 may assist in reducing intrusion of the sill 14 towards the occupant compartment. The reinforcement 16 may absorb impact forces directed from multiple directions. For example, the vehicle 10 may be impacted at any angle. Depending on the angle of impact, the reinforcement 16 may resist bending, twisting, and/or crushing, e.g., forces from a pole impact.

With reference to FIG. 1, the vehicle 10 may include a body 36. The body 36 may, for example, be of a unibody construction. In the unibody construction, the body 36, e.g., the sills 14, serves as the vehicle frame, and the body 36 (including the sills 14, pillars, roof rails, etc.) is unitary, i.e., a continuous one-piece unit. As another example, the vehicle 10 may have a body-on-frame construction (also referred to as a cab-on-frame construction). In other words, the body 36 is mounted on a frame of the vehicle 10, and the body 36 and the frame are separate components, i.e., are modular. In the body-on-frame configuration, the body 36 is supported on and affixed to the frame. Alternatively, the body 36 may have any suitable construction. The body 36 may be formed of any suitable material, e.g., steel, aluminum, etc.

Figure 2:
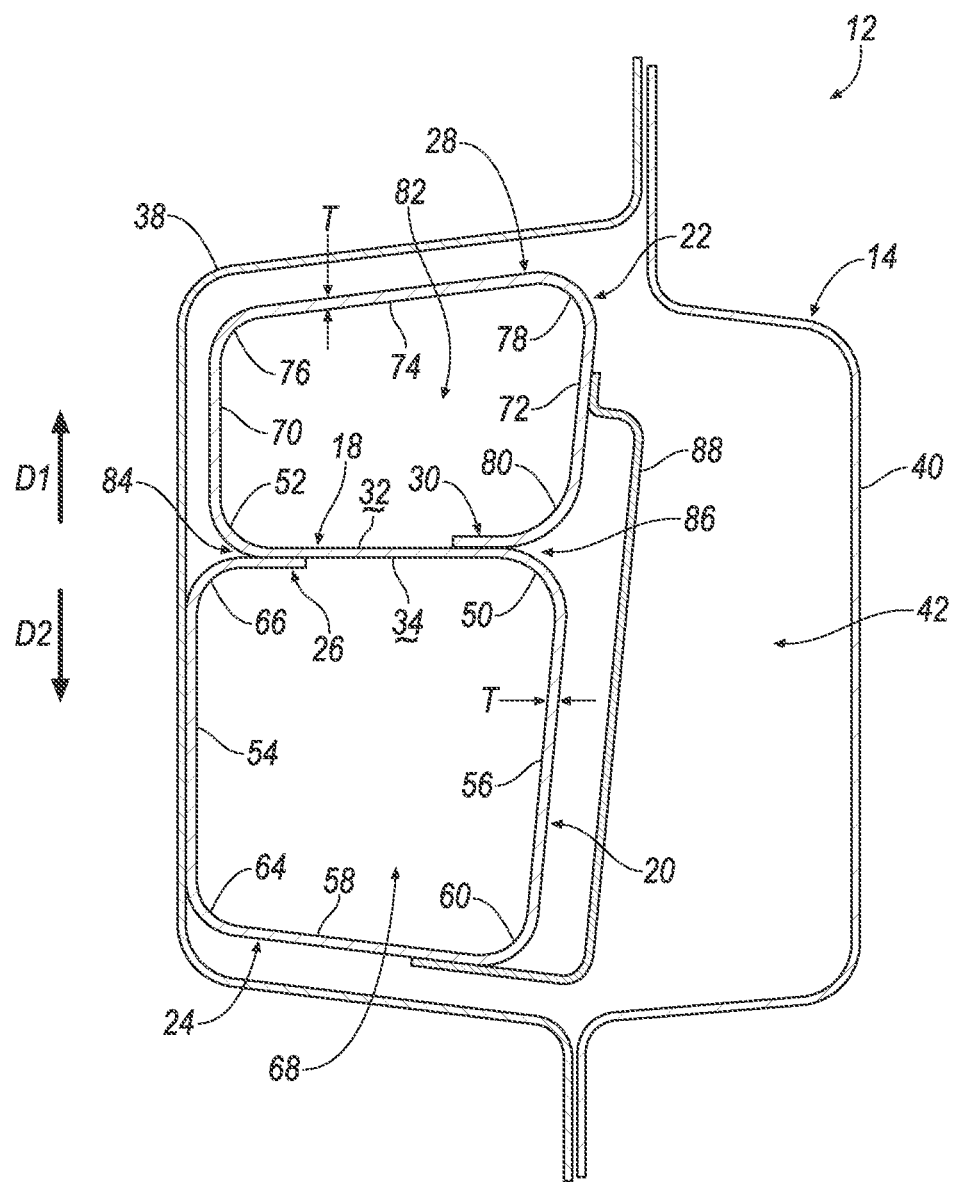
FIG. 2 is a cross-sectional view of the reinforcement disposed between the sill inner and the sill outer along section 2 in FIG. 1.

The body 36 may include the sill assembly 12 having the sill 14 and the reinforcement 16, as set forth above. The sill 14 may include a sill inner 38 and a sill outer 40 attached to the sill inner 38. The sill inner 38 and the sill outer 40 may define a cavity 42 therebetween, as shown in FIG. 2. The cavity 42 may, for example, be elongated along the axis A. The body 36 may include two sill assemblies 12 spaced from each other in a cross-vehicle direction D, i.e., one on a left side of the vehicle 10 and one on a right side of the vehicle 10, as shown in FIG. 4.

The sill outer 40 and the sill inner 38 may be fixed to each other in any suitable manner, e.g., welding, fastening, etc. The sill 14, e.g., the sill inner 38 and the sill outer 40, may be formed of any suitable material, e.g., steel, aluminum, etc.

The body 36 may include one or more cross members 44 extending from one sill assembly 12 to the other sill assembly 12, i.e., in the cross-vehicle direction D. In other words, the cross members 44 may extend transverse to the axis A. Additionally, or alternatively, the body 36 may include an underbody, e.g., a floor, extending both in the cross-vehicle direction D, e.g., from one sill assembly 12 to the other sill assembly 12, and along the axis A.

Figure 4:
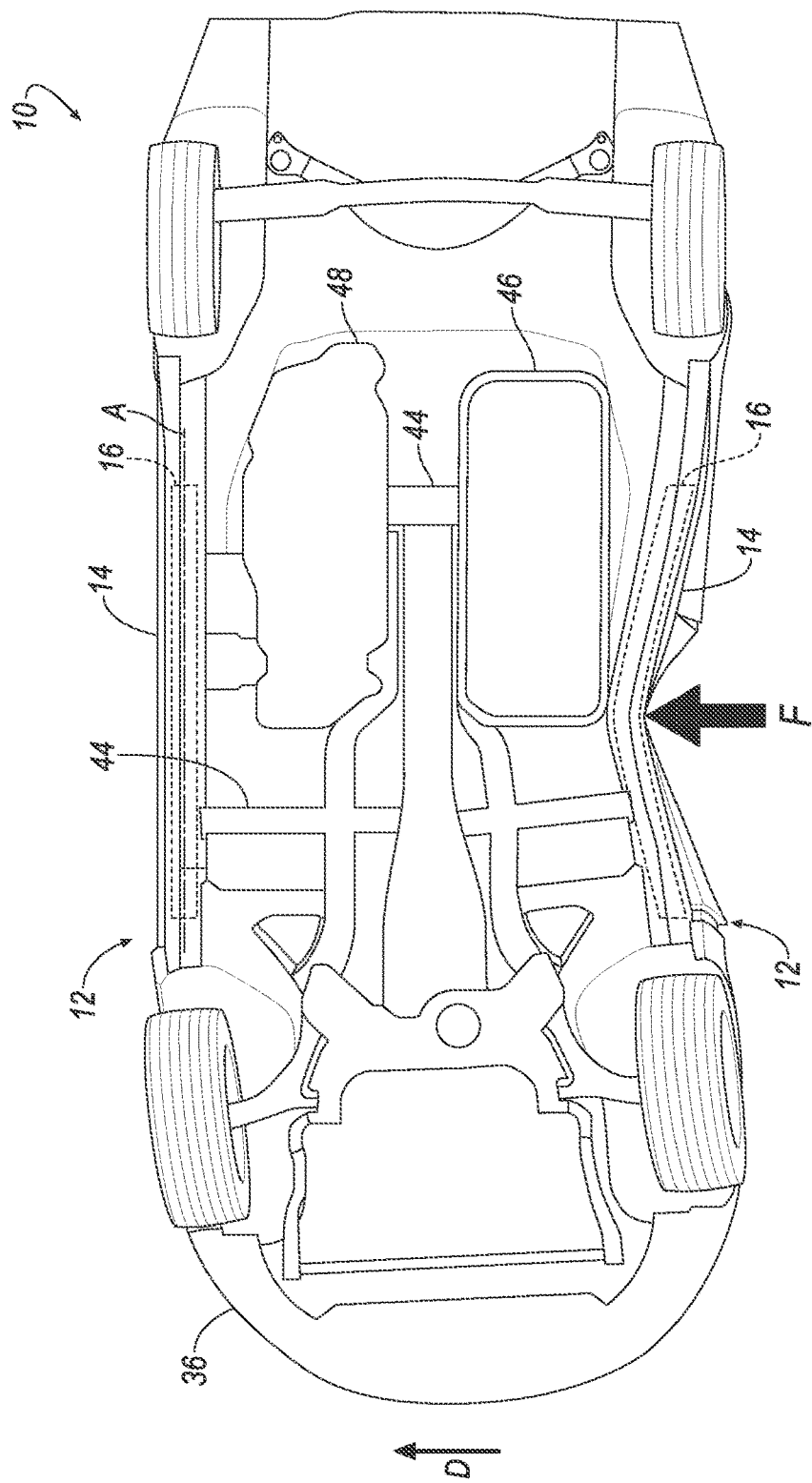
FIG. 4 is a bottom view of the vehicle during a side impact with the sill reinforcements shown in hidden lines.

With reference to FIG. 4, the vehicle 10 may be a battery electric vehicle. The vehicle 10 may include a battery 46 disposed between the sill assemblies 12 and supported by the body 36. The battery 46 may, for example, be disposed adjacent at least one sill 14. For example, the battery 46 may be adjacent only one sill 14, i.e., the battery 46 may be disposed on one side of the vehicle 10. Alternatively, the battery 46 may extend from one sill 14 to the other sill 14.

The battery 46 may be disposed adjacent the sill inner 38 of at least one sill 14. The sill inner 38 of at least one sill 14 may be disposed between the battery 46 and the reinforcement 16 of the one sill assembly 12. The battery 46 may, for example, extend along the sill 14, i.e., along the axis A. The battery 46 may create packaging constraints along one sill 14, and the reinforcement 16 may limit deformation of the sill 14 to reduce the magnitude and likelihood of intrusion into the battery 46 during the vehicle impact. Further, the battery 46 may add weight to the vehicle 10, e.g., the battery 46 may add weight to the vehicle 10 near the center of gravity of the vehicle 10. The reinforcement 16 may be configured to both absorb energy and to resist deformation to absorb the impact force F and/or prevent damage to the battery 46 from the impact force F.

The battery 46 may be supported by the body 36 directly or through intermediate components. The battery 46 may be, for example, attached to one or more cross members 44. For example, the battery 46 may include a plurality of brackets (not shown) connected to one or more cross members 44. The brackets may support the battery 46 on the body 36, i.e., the battery 46 may be sandwiched between the brackets and the one or more cross members 44. The battery 46 may be attached to the one or more cross members 44 in any suitable manner, e.g., fasteners. The battery 46 may be any suitable type of battery 46, e.g., a lithium-ion battery.

With reference to FIG. 4, the vehicle 10 may include a fuel tank 48 spaced from the battery 46 in the cross-vehicle direction D. For example, the fuel tank 48 may be disposed adjacent one of the sill assemblies 12. For example, the fuel tank 48 may be disposed adjacent one of the sill assemblies 12 and the battery 46 may be adjacent the other of the sill assemblies 12, i.e., the fuel tank 48 may be on the other side of the vehicle 10 relative to the battery 46. Specifically, the battery 46 may be disposed adjacent the sill inner 38 of one sill 14, and the fuel tank 48 may be disposed adjacent the sill inner 38 of the other sill 14. In other words, the sill inner 38 of the other sill 14 may be disposed between the fuel tank 48 and the reinforcement 16 of the other sill assembly 12. The fuel tank 48 may, for example, extend along the sill 14, i.e., along the axis A. The fuel tank 48 may be formed of any suitable material, e.g., plastic, metal, etc.

The fuel tank 48 may be supported by the body 36, i.e., directly or through intermediate components. The fuel tank 48 may be, for example, attached to one or more cross members 44. For example, the fuel tank 48 may include straps (not shown) extending around the fuel tank 48 in the cross-vehicle direction D. The straps may support the fuel tank 48 on the body 36, i.e., the fuel tank 48 may be sandwiched between the straps and the one or more cross members 44. The fuel tank 48, e.g., the straps, may be attached to one or more cross members 44 in any suitable manner, e.g., fasteners.

Figure 3:
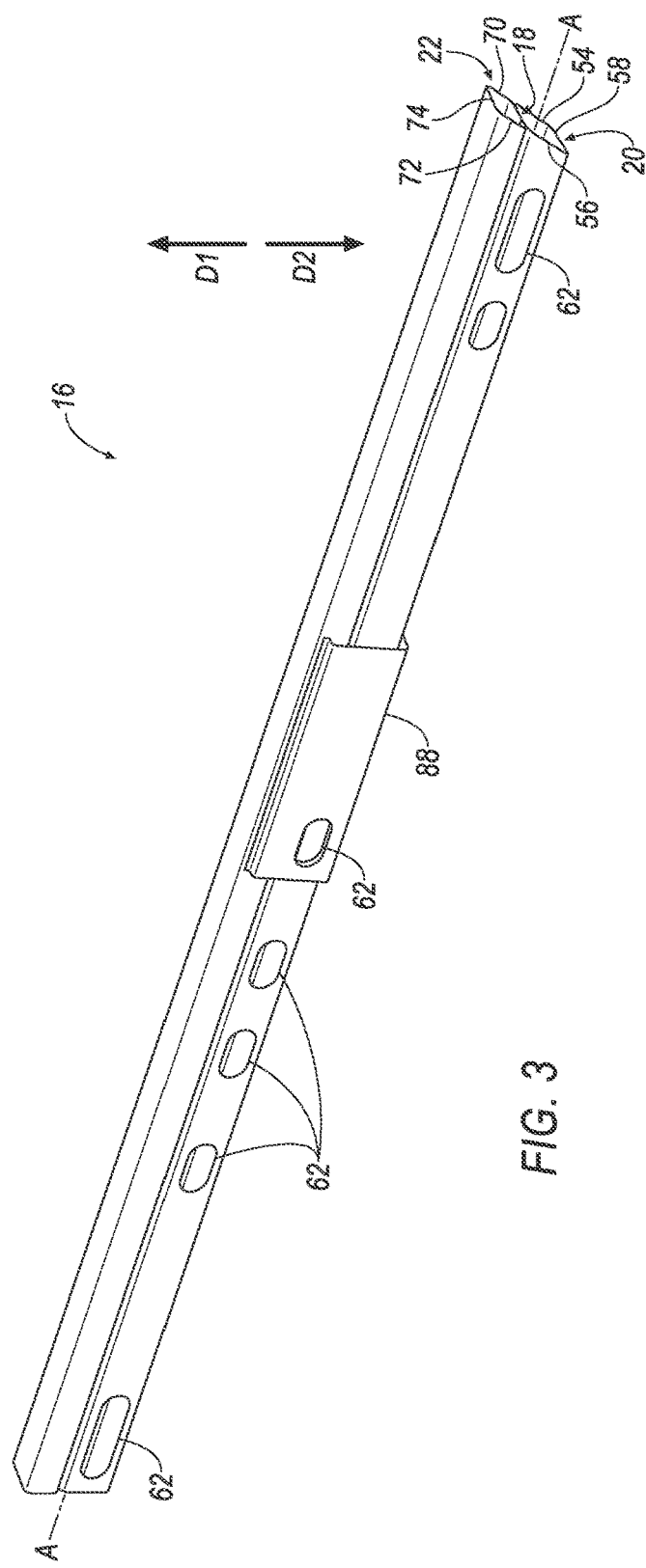
FIG. 3 is a perspective view of the reinforcement.

The reinforcement 16 may be disposed in the cavity 42 of the sill 14, as shown in FIG. 2. One reinforcement 16 may be disposed in each cavity 42. In other words, one reinforcement 16 may be disposed on each side of the vehicle 10. The reinforcement 16 may be elongated along the axis A, as shown in FIG. 3. In other words, the reinforcement 16 may extend from one end (not numbered) of the sill 14 to the other end (not numbered) of the sill 14. The reinforcement 16 may extend at least partially across the cavity 42 in the cross-vehicle direction D. In other words, the reinforcement 16 may be spaced from the sill outer 40 and/or the sill inner 38. For example, as shown in FIG. 2, the reinforcement 16 may be adjacent the sill inner 38 and spaced from the sill outer 40.

The reinforcement 16 may be formed of any suitable material. For example, the reinforcement 16 may be formed of martensitic steel. Martensitic steel, as is known, may be formed by the rapid quenching of austenite irons, i.e., a solid solution of iron with an alloying element; and may have a hardness and a strength greater than the hardness and the strength, respectively, of austenite irons e.g., carbon steels, stainless steels, etc.

The reinforcement 16 may be unitary, i.e., a continuous one-piece unit, from the first end 26 to the second end 30. For example, the reinforcement 16 may extend continuously from the first end 26 to the second end 30, as shown in FIG. 2. In this situation, the reinforcement 16 may be roll formed from a single blank. As another example, the reinforcement 16 may include a plurality of segments that are formed separate from each other and subsequently attached together. In this situation, the plurality of segments may be attached to each other to extend from the first end 26 to the second end 30 of the reinforcement 16. The plurality of segments may be attached to each other in any suitable manner, e.g., welding, adhesive, fasteners, etc.

With reference to FIG. 2, the intermediate portion 18 may extend transverse to the axis A, e.g., in the cross-vehicle direction D. The intermediate portion 18 may, for example, extend from the first lobe 20 to the second lobe 22. A first transition 50 to the first lobe 20 and a second transition 52 to the second lobe 22 may be rounded or angular. The first and second transitions 50, 52 may face in opposite directions. For example, the first transition 50 may face downward relative to the intermediate portion 18, and the second transition 52 may face upward relative to the intermediate portion 18. The first transition 50 and the second transition 52 may be spaced from each other in the cross-vehicle direction D. For example, the second transition 52 may be adjacent the sill inner 38, and the first transition 50 may be disposed between the second transition 52 and the sill outer 40.

With reference to FIG. 2, the intermediate portion 18 may be disposed between the first lobe 20 and the second lobe 22. For example, the first lobe 20 may be disposed below the intermediate portion 18, and the second lobe 22 may be disposed above the intermediate portion 18. The first lobe 20 may be supported by the sill inner 38, i.e., directly or through intermediate components, as set forth further below. The second lobe 22 may be supported by the first lobe 20, i.e., directly or through intermediate components. For example, the second lobe 22 may be supported by the first lobe 20 through the intermediate portion 18.

With reference to FIG. 3, the first lobe 20 and the second lobe 22 may be elongated along the axis A. The first lobe 20 and the second lobe 22 each may have a concave shape relative to the axis A. In other words, the first lobe 20 and the second lobe 22 each may be curved, i.e., bent, about the axis A.

With reference to FIG. 2, the first wall 24 of the first lobe 20 may include an inner side 54, an outer side 56 spaced from the inner side 54, and a bottom side 58 extending from the inner side 54 to the outer side 56. The outer side 56 of the first wall 24 may extend in a first direction D1 transverse to the cross-vehicle direction D, e.g., generally downward, from the intermediate portion 18, e.g., the first transition 50, to the bottom side 58 of the first wall 24. A transition 60 from the outer side 56 of the first wall 24 to the bottom side 58 of the first wall 24 may be rounded or angular. The outer side 56 of the first wall 24 may, for example, be disposed between the sill outer 40 and the inner side 54 of the first wall 24. The outer side 56 of the first wall 24 may include a hole 62 designed to receive a weld head (not shown), e.g., may be sized and shaped to receive the weld head for welding the reinforcement 16 of the sill assembly 12. The weld head may, for example, weld the reinforcement 16, e.g., the inner side 54 of the first wall 24, to the sill inner 38.

With continued reference to FIG. 2, the bottom side 58 of the first wall 24 may extend in the cross-vehicle direction D, i.e., transverse to the axis A. For example, the bottom side 58 of the first wall 24 may extend generally parallel to the intermediate portion 18 of the reinforcement 16. The bottom side 58 of the first wall 24 may, for example, be spaced from the intermediate portion 18 in the first direction D1. In other words, the bottom side 58 of the first wall 24 may be below the intermediate portion 18.

With continued reference to FIG. 2, the inner side 54 of the first wall 24 may extend from the bottom side 58 of the first wall 24 to the first end 26, e.g., towards the intermediate portion 18. In other words, the inner side 54 of the first wall 24 may extend in a second direction D2 opposite the first direction D1, e.g., generally upward. A transition 64 between the bottom side 58 of the first wall 24 and the inner side 54 of the first wall 24 may be rounded or angular. The inner side 54 of the first wall 24 may abut the sill inner 38. The inner side 54 of the first wall 24 may, for example be attached to the sill inner 38. The inner side 54 of the first wall 24 may be attached to the sill inner 38 by any suitable manner. For example, the inner side 54 of the first wall 24 may be attached to the sill inner 38 by both fasteners and welding. Alternatively, the inner side 54 of the first wall 24 may be attached by any other suitable manner, e.g., adhesive.

With continued reference to FIG. 2, the first end 26 may extend from the inner side 54 of the first wall 24 in the cross-vehicle direction D towards the outer side 56 of the first wall 24. The first end 26 may extend any suitable amount in the cross-vehicle direction D towards the outer side 56 of the first wall 24. The first end 26 may, for example, be spaced from the outer side 56 of the first wall 24. A transition 66 between the inner side 54 of the first wall 24 and the first end 26 may be rounded or angular.

With continued reference to FIG. 2, the first wall 24 of the first lobe 20 may define a first cavity 68. For example, the first wall 24 and the intermediate portion 18 may enclose the first cavity 68. The first cavity 68 may, for example, be disposed below the intermediate portion 18. In other words, the first lobe 20 may include the first cavity 68. The first cavity 68 may, for example, be elongated along the axis A. In other words, the first cavity 68 may extend along the reinforcement 16 along the axis A With continued reference to FIG. 2, the second wall 28 may include an inner side 70, an outer side 72 spaced from the inner side 70, and a top side 74 extending from the inner side 70 to the outer side 72. The inner side 70 of the second wall 28 may extend in the second direction D2 from the intermediate portion 18, e.g., the second transition 52, to the top side 74 of the second wall 28. A transition 76 from the inner side 70 of the second wall 28 to the top side 74 may be rounded or angular. The inner side 70 of the second wall 28 may be disposed adjacent the sill inner 38. The inner side 70 of the second wall 28 may, for example, extend generally parallel with the inner side 54 of the first wall 24.

With continued reference to FIG. 2, the top side 74 of the second wall 28 may extend in the cross-vehicle direction D, i.e., transverse to the axis A. For example, the top side 74 of the second wall 28 may extend generally parallel to the intermediate portion 18 of the reinforcement 16. The top side 74 of the second wall 28 may, for example, be spaced from the intermediate portion 18 in the second direction D2. In other words, the top side 74 of the second wall 28 may be above the intermediate portion 18.

With continued reference to FIG. 2, the outer side 72 of the second wall 28 may extend in the first direction D1 from the top side 74 of the second wall 28 to the second end 30. A transition 78 from the top side 74 of the second wall 28 to the outer side 72 of the second wall 28 may be rounded or angular. The outer side 72 of the second wall 28 may, for example, be disposed between the sill outer 40 and the inner side 70 of the second wall 28.

With continued reference to FIG. 2, the second end 30 may extend from the outer side 72 of the second wall 28 in the cross-vehicle direction D towards the inner side 70 of the second wall 28. The second end 30 may extend any suitable amount in the cross-vehicle direction D towards the inner side 70 of the second wall 28. The second end 30 may, for example, be spaced from the inner side 70 of the second wall 28. A transition 80 between the outer side 72 of the second wall 28 and the second end 30 may be rounded or angular.

With continued reference to FIG. 2, the second wall 28 of the second lobe 22 may define a second cavity 82. For example, the second wall 28 and the intermediate portion 18 may enclose the second cavity 82. The second cavity 82 may, for example, be disposed above the intermediate portion 18. In other words, the second lobe 22 may include the second cavity 82. The second cavity 82 may, for example, be elongated along the axis A. In other words, the second cavity 82 may extend along the reinforcement 16 along the axis A.

The first cavity 68 and the second cavity 82 may be a same or different shape. The first cavity 68 and the second cavity 82 may have any suitable shape. For example, the first cavity 68 and the second cavity 82 may be trapezium shaped. Alternatively, the first cavity 68 and the second cavity 82 may be trapezoidal shaped, square shaped, rectangular shaped, etc.

The first cavity 68 may be larger than the second cavity 82, as shown in FIG. 2. For example, the bottom side 58 of the first wall 24 may be spaced farther from the intermediate portion 18 than the top side 74 of the second wall 28 is spaced from the intermediate portion 18. In other words, the first cavity 68 may extend farther in the first direction D1 than the second cavity 82 extends in the second direction D2. The first cavity 68 may be larger than the second cavity 82 to receive the weld head, as set forth above.

With reference to FIG. 2, the reinforcement 16 may include a first surface 32 and a second surface 34 facing away from the first surface 32. For example, the first surface 32 may face away from the first cavity 68 on the first lobe 20 and the second surface 34 may face towards the first cavity 68 on the first lobe 20. As another example, the first surface 32 may face towards the second cavity 82 on the second lobe 22 and the second surface 34 may face away from the second cavity 82 on the second lobe 22. The first surface 32 and the second surface 34 may both extend from the first end 26 to the second end 30 of the reinforcement 16. In other words, the first surface 32 and the second surface 34 may extend across the intermediate portion 18 from the first lobe 20 to the second lobe 22.

With continued reference to FIG. 2, the reinforcement 16 may have a thickness T extending from the first surface 32 to the second surface 34, i.e., a wall thickness T. The reinforcement 16 may, for example, be thin from the first surface 32 to the second surface 34. The thickness T may be uniform from the first end 26 to the second end 30 of the reinforcement 16. In other words, the thickness T may be the same at any point on the reinforcement 16 between the first end 26 and the second end 30.

The thickness T of the reinforcement 16 may be between 1-3 mm. The thickness T of the reinforcement 16 may depend on the vehicle component adjacent the sill assembly 12. For example, when the battery 46 is adjacent the sill assembly 12, the thickness T of the reinforcement 16 may be 2.5 mm. As another example, when the fuel tank 48 is adjacent the sill assembly 12, the thickness T of the reinforcement 16 may be 1.8 mm. The thickness T may be larger when the battery 46 is adjacent the sill assembly 12 to decrease intrusion of the sill 14 towards the battery 46 to reduce and/or prevent the sill 14 from contacting the battery 46. Since the fuel tank 48 is capable of more deformation than the battery 46 before failure, the thickness T may be smaller when the fuel tank 48 is adjacent the sill assembly 12 to reduce vehicle weight.

With reference to FIG. 2, the first wall 24 and the second wall 28 may extend towards each other along opposite surfaces 32, 34 of the intermediate portion 18 at the first and second ends 26, 30. The first end 26 may, for example, extend along the second surface 34 of the intermediate portion 18, i.e., adjacent the first cavity 68. The second end 30 may, for example, extend along the first surface 32 of the intermediate portion 18, i.e., adjacent the second cavity 82. In other words, the first end 26 may be disposed below the intermediate portion 18 and the second end 30 may be disposed above the intermediate portion 18. The first end 26 and the second end 30 may be spaced from each other in the cross-vehicle direction D. Both the first end 26 and the second end 30 may extend in the cross-vehicle direction D towards the axis A, i.e., each other. For example, the first end 26 may extend in the cross-vehicle direction D away from the sill inner 38, i.e., towards the sill outer 40. As another example, the second end 30 may extend in the cross-vehicle direction D away from the sill outer 40, i.e., towards the sill inner 38.

With continued reference to FIG. 2, the intermediate portion 18 and the first end 26 may define a first valley 84 therebetween. For example, the transition 66 of the first wall 24 from the inner side 54 of the first wall 24 to the first end 26 and the second transition 52 of the intermediate portion 18 to the second lobe 22 may be the sides of the first valley 84. The first valley 84 may, for example, be disposed adjacent the sill inner 38.

With continued reference to FIG. 2, the intermediate portion 18 and the second end 30 may define a second valley 86 therebetween. For example, the transition 80 of the second wall 28 from the outer side 72 of the second wall 28 to the second end 30 and the first transition 50 of the intermediate portion 18 to the first lobe 20 may be the sides of the second valley 86. The second valley 86 may, for example, be spaced from the first valley 84. For example, the second valley 86 may be disposed between the first valley 84 and the sill outer 40.

With continued reference to FIG. 2, the first valley 84 and the second valley 86 may both be external to each of the first cavity 68 and the second cavity 82. For example, the intermediate portion 18 may be disposed between the first valley 84 and the second cavity 82, and the first end 26, i.e., the first wall 24, may be disposed between the first valley 84 and the first cavity 68. As another example, the intermediate portion 18 may be disposed between the second valley 86 and the first cavity 68, and the second end 30, i.e., the second wall 28, may be disposed between the second valley 86 and the second cavity 82. In other words, the first valley 84 and the second valley 86 both may be separate from each of the first cavity 68 and the second cavity 82.

The first lobe 20 may be welded to the intermediate portion 18 in the first valley 84, and the second lobe 22 may be welded to the intermediate portion 18 in the second valley 86. The transition 66 of the first wall 24 from the inner side 54 to the first end 26 may, for example, be welded to the intermediate portion 18, e.g., the second transition 52. The transition 80 of the second wall 28 from the outer side 72 to the second end 30 may, for example, be welded to the intermediate portion 18, e.g., the first transition 50. In other words, both the first end 26 and the second end 30 may be welded to the intermediate portion 18.

The reinforcement 16 may include a bracket 88 extending transverse to the axis A from the first lobe 20 to the second lobe 22, as shown in FIG. 3. The bracket 88 may, for example, extend across the second valley 86. The bracket 88 may be disposed between the reinforcement 16 and the sill outer 40, as shown in FIGS. 1 and 2. In other words, the bracket 88 may be adjacent the outer side 56 of the first wall 24 and the outer side 72 of the second wall 28. The bracket 88 may be formed of any suitable material, e.g., steel, aluminum, etc.

The bracket 88 may be elongated along the reinforcement 16, i.e., the axis A, as shown in FIGS. 1 and 3. The bracket 88 may be elongated any suitable amount. For example, the bracket 88 may be elongated along the axis A the same amount as the battery 46. The bracket 88 may, for example, be attached to the reinforcement 16 to reduce and/or prevent intrusion into the battery 46. In other words, the bracket 88 may reinforce the reinforcement 16 to reduce deformation of the sill 14 towards the battery 46.

The bracket 88 may be attached to both the first wall 24, i.e., the first lobe 20, and the second wall 28, i.e., the second lobe 22. For example, the bracket 88 may be attached to the bottom side 58 of the first wall 24 and the outer side 72 of the second wall 28, as shown in FIGS. 2 and 3. As another example, the bracket 88 may be attached to the top side 74 of the second wall 28 and the bottom side 58 of the first wall 24. The bracket 88 may be attached to the first wall 24 and the second wall 28 in any suitable manner, e.g., fasteners, welding, adhesive, etc.

During a side impact, one of the sill assemblies 12 may be subjected to the impact force F, as shown in FIG. 4. The impact force F may include a horizontal component, i.e., directed toward the side of the vehicle 10 in the cross-vehicle direction D, and an oblique component, i.e., directed transverse to both the axis A and the cross-vehicle direction D. The reinforcement 16 is configured to resist sill buckling due to both the horizontal component and the oblique component of the impact force F. The first lobe 20 and the second lobe 22 may reinforce the buckling strength of the intermediate portion 18. The unitary structure of the reinforcement 16 may increase the buckling strength of the reinforcement 16 by reducing fracture points on the reinforcement 16, e.g., along connections between segments. During the side impact, the impact force F may be transferred from the sill outer 40 to the reinforcement 16. In this situation, the reinforcement 16 may absorb energy from the impact force F. Specifically, the first lobe 20, the second lobe 22, and the intermediate portion 18 may absorb energy from the impact force F to resist deformation of the sill 14. Additionally, the bracket 88 may absorb energy from the impact force F to resist deformation of the sill 14. In other words, the reinforcement 16 may limit intrusion of the sill 14 towards the battery 46 by resisting bending and/or crushing.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A sill assembly comprising:
a sill elongated along an axis; and
a reinforcement disposed in the sill;
the reinforcement, in cross-section transverse to the axis, including an intermediate portion, a first lobe having a first wall extending from the intermediate portion to a first end, and a second lobe having a second wall extending from the intermediate portion to a second end;
the first and second ends abutting opposite surfaces of the intermediate portion;
wherein the sill includes a sill inner and a sill outer attached to the sill inner, the sill inner and the sill outer defining a cavity therebetween, and the reinforcement being disposed in the cavity; and
wherein the first wall includes an inner side attached to the sill inner and an outer side spaced from the inner side, and the outer side includes a hole designed to receive a weld head.

2. The sill assembly of claim 1, wherein the first wall of the first lobe defines a first cavity and the second wall of the second lobe defines a second cavity, the first cavity being larger than the second cavity.

3. The sill assembly of claim 2, wherein the first cavity and the second cavity are trapezium shaped.

4. The sill assembly of claim 2, wherein the intermediate portion and the first end define a first valley therebetween, and the intermediate portion and the second end define a second valley therebetween spaced from the first valley, the first valley and the second valley both external to the first cavity and the second cavity.

5. The sill assembly of claim 4, wherein the first lobe is welded to the intermediate portion in the first valley, and the second lobe is welded to the intermediate portion in the second valley.

6. The sill assembly of claim 1, wherein first wall and the second wall extend toward each other along the intermediate portion at the first and second ends.

7. The sill assembly of claim 1, further comprising a bracket extending transverse to the axis from the first lobe to the second lobe, the bracket connected to both the first lobe and the second lobe.

8. The sill assembly of claim 1, wherein the reinforcement is unitary from the first end to the second end.

9. The sill assembly of claim 1, wherein the reinforcement includes a thickness between 1-3 mm, the thickness being uniform from the first end to the second end.

10. The sill assembly of claim 1, wherein the reinforcement is formed of martensitic steel.

11. The sill assembly of claim 1, further comprising a battery disposed adjacent the sill.

12. A reinforcement comprising:
an intermediate portion;
a first lobe having a first wall extending from the intermediate portion to a first end;
a second lobe having a second wall extending from the intermediate portion to a second end;
the first and second ends abutting opposite surfaces of the intermediate portion; and
the first end and the second end extending from a respective transition toward each other along the intermediate portion.

13. The reinforcement of claim 12, wherein the first wall of the first lobe defines a first cavity and the second wall of the second lobe defines a second cavity, the first cavity being larger than the second cavity.

14. The reinforcement of claim 13, wherein the intermediate portion and the first end define a first valley therebetween, and the intermediate portion and the second end define a second valley therebetween spaced from the first valley, the first valley and the second valley both external to the first cavity and the second cavity.

15. The reinforcement of claim 14, wherein the first lobe is welded to the intermediate portion in the first valley, and the second lobe is welded to the intermediate portion in the second valley.

16. The reinforcement of claim 12, further comprising a bracket extending from the first lobe to the second lobe, the bracket connected to both the first lobe and the second lobe.

17. A sill assembly comprising:
a sill elongated along an axis; and
a reinforcement disposed in the sill;
the reinforcement, in cross-section transverse to the axis, including an intermediate portion, a first lobe having a first wall extending from the intermediate portion to a first end and defining a first cavity, and a second lobe having a second wall extending from the intermediate portion to a second end and defining a second cavity;
the first and second ends abutting opposite surfaces of the intermediate portion; and
a bracket extending transverse to the axis from the first lobe to the second lobe, the bracket disposed external to both the first cavity and the second cavity and connected to both the first lobe and the second lobe.

18. The reinforcement of claim 17, wherein the intermediate portion and the first end define a first valley therebetween, and the intermediate portion and the second end define a second valley therebetween spaced from the first valley, the first valley and the second valley both external to the first cavity and the second cavity.

19. The reinforcement of claim 18, wherein the bracket extends across the second valley.

20. The reinforcement of claim 17, wherein the sill includes a sill inner and a sill outer, the bracket is disposed between the reinforcement and the sill outer.

* * * * *